March 9, 1937. B. CAPPELLI 2,073,412
DEVICE FOR RECORDING SOUND ORIGINATING IN THE HUMAN BODY
Filed March 31, 1933
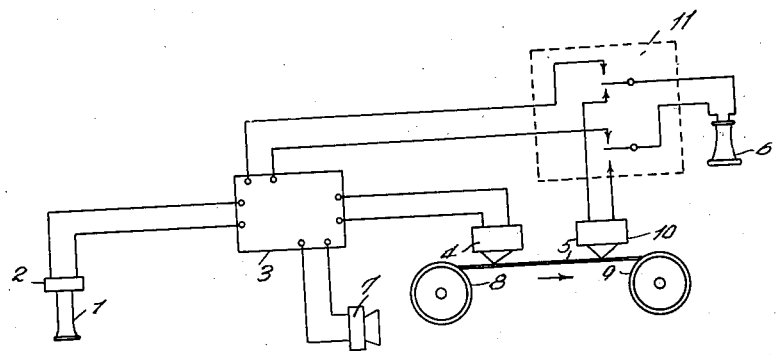
Bruno Cappelli
INVENTOR
By Otto Munk
his ATTY.

Patented Mar. 9, 1937

2,073,412

UNITED STATES PATENT OFFICE 2,073,412

DEVICE FOR RECORDING SOUND ORIGINATING IN THE HUMAN BODY

Bruno Cappelli, Sasso Pisano, Pisa, Italy

Application March 31, 1933, Serial No. 663,674
In Germany April 23, 1932

2 Claims. (Cl. 179—100.2)

The present invention is a new and improved system of recording, relating particularly to magnetic recording on steel bands and wires, the physiological and pathological noises of the human body together with explanatory words of a lecturer.

One object of the invention is to record internal sounds or noises of the human body, for instance cardiac or pulmonary noises, by a combination stethoscope and microphone the variable current of which is collected, amplified and caused to affect an electromagnetic recording device by means of which the record may be registered on a portable and storable magnetizable medium from which numerous reproductions of the amplified or not amplified original noises or sounds may be obtained.

Another object of the present invention is recording on the magnetizable medium the physiological and pathological noises or sounds as well as the explanatory words of the lecturer or operator who takes the stethograms, for instance the words of the physician who is observing the patient.

Another object of the invention is to control the intensities of the electric currents corresponding to the physiological noises and the human voice to be recorded on the same magnetizable medium so that the reproduction in a class room by means of loud-speaker or in a medical office by means of ear-phones shall be of suitable acoustic intensity.

Another object of the invention is to effect auscultation of the noises to be recorded by means of a telephone electrically connected to the combination microphone and stethoscope in order that the operator who records the noises may be able to control the quality and intensity of simultaneously recorded noises.

Another object of the invention is controlling the electromagnetic record by means of a telephone connected to a reproducing electromagnet mounted at a little distance beyond the recording magnet. This applies particularly to electromagnetic recording on a steel band.

The invention is illustrated diagrammatically in the annexed drawing in which the only figure shows the invention applied to electromagnetic recording on a steel band or wire.

A stethoscope 1 is provided with a microphone 2 electrically connected to an amplifying device 3 to which the magnetic recording device 4 is electrically connected. The recorder 4 cooperates in the well known manner with the traveling magnetizable medium 5.

The telephonic receiver 6 serves to collect the noise or sound picked up by the microphone 2. The receiver 6 is connected to a suitable stage of the amplifier. The same or another suitable stage of the amplifier has connected with it the microphone 7. Sounds picked up on the magnetizable medium 5 by microphone, e. g. the voice of the operator, are recorded. The microphone 7 is so arranged that the intensity of recording is acoustically uniform with the intensity of recording of noises and sounds collected by the electric stethoscope 1—2. This arrangement may also include a sound volume controller.

The circuits for connecting the microphone 2, the telephone receiver 6, the microphone 7 and the recorder or electromagnet 4 constituting the amplifying system 3, are not illustrated, as they are well known.

The magnetic recorder 4 connected to the amplifier 3 variably magnetizes the traveling medium 5, e. g. a steel band or wire the movement of which is ensured by an unwinding reel 8 and a winding reel 9 driven in the well known manner.

A reproducing electromagnet 10 located at a short distance beyond the recording magnet 4 permits the operator to control the recording on the magnetizable medium 5 by means of the switch 11 and the telephone receiver 6.

The telephone receiver 6 may be directly connected to the amplifier 3 through the switch 11 for the purpose already described.

The reproduction of the records obtained with the above described system is effected in the ordinary way.

My invention is very well adapted for diagnostic purposes as it is easy to keep steel bands and wires in a restricted space. The recording is easy on wires, nearly unlimited faithful reproductions of the original sound are obtained, and the records may be mailed or shipped without fear of breakage.

By means of the present invention periodic records of clinical observations on a given patient may be kept and reproduced at any time so as to enable the physician to compare the various acoustic phenomena observed in different periods and phases of the malady.

It will be obvious to those skilled in the art that the above illustrated form is not the only one possible, and that a number of modifications may be effected within the scope of the present invention.

Thus, for instance, the stethoscope may be provided with a carbon, electromagnetic or electrostatic microphone. The amplifying may be effected by one of the known thermionic valves or other known or still unknown systems, and recording may be effected in the manner above shown or, for instance, by combining acoustic recording on a plate or steel band with optic recording on a film.

It is not necessary that the recording devices be kept in the same room in which the patient dwells. For instance in a sanatorium there may be a central recording cabinet to which electric leads are connected from the beds of the patients whose stethograms are to be taken daily or at other regular periods.

Having now particularly described and ascertained the nature of my said invention and in what manner the same is to be performed, I declare that what I claim is:

1. In a sound recording device for physiologic and pathologic noises of the human body, a stethoscope, a microphone mounted thereon, an amplifier connected with said microphone, a recording magnet connected with said amplifier, a magnetizable medium, means for moving said medium past said recording magnet so as to magnetize it corresponding to the vibrations of the microphone, a magnetic reproducing assembly, arranged adjacent said recording magnet to be continuously operated by said magnetized medium, a speaker and a switch for alternatively connecting said speaker with said amplifier and said reproducing assembly.

2. In a device, as claimed in claim 1, the arrangement of a second microphone to receive the vibrations of the human voice, said second microphone being connected to said amplifier.

BRUNO CAPPELLI.